United States Patent Office 2,873,202
Patented Feb. 10, 1959

2,873,202

WATER REPELLENT AND MAR RESISTANT COATING COMPOSITION CONTAINING A WAXY DIALKYL ETHER

Francis E. Chapman, Racine, Wis., assignor to S. C. Johnson & Son, Inc., Racine, Wis.

No Drawing. Application February 23, 1956
Serial No. 567,053

6 Claims. (Cl. 106—230)

This invention relates to protective coating compositions and particularly to paint and varnish compositions containing one or more film forming resins and one or more of certain synthetic waxy ethers, the ether being compatible with the coating resin.

During recent years the beneficial results attainable by the addition of natural and synthetic waxes to paint and varnish compositions have been well established. Such waxes are known to render a paint or varnish composition resistant to marring, abrasion, dirt and mildew, and water repellant.

Whereas natural waxes including those of animal origin, such as beeswax; vegetable waxes, such as carnauba and ouricury; and mineral waxes, especially the paraffins, have been or are presently employed as constituents of protective coating compositions and have successfully imparted desirable characteristics to the paint and varnish films, nevertheless, these constituents also impart their inherent, undesirable physical properties to the film. These materials have very limited solubility in paints and varnishes and when incorporated even in very small amounts, destroy adhesion and inhibit film curing. Even with the inclusion of efficacious drying agents, a paint or varnish composition containing one of the above waxes as a component produces a film which requires a lengthy period to dry, remaining tacky and sticky to the touch for periods often exceeding 72 hours. Furthermore, such paints and varnishes have lacked the lasting adhesive qualities demanded of a paint and varnish film.

Various synthetic waxes or resins, such as those described in U. S. Patent 2,653,910, have been prepared and tried in such compositions in an endeavor to minimize the above limitations. Coating compositions containing resinous components complemented with synthetic waxes have been prepared using common solvents for both the resin and synthetic wax. But even where formulation of such synthetic wax paints has been successful in partially eliminating these undesirable features, an additional preclusion exists. Upon evaporation of the solvent the colloidally dispersed materials, being incompatible, tend to molecularly constrict, causing a "haze" or cloud to form in the film.

Certain synthetic waxes have now been found which impart water repellency and mar and abrasion resistance to a protective coating composition and which are compatible with the resinous constituent of such compositions thereby precluding any molecular constriction or haziness in the dried film. This invention, therefore, relates to protective coating compositions comprising a resin, a thinner, and a small amount of a straight chain saturated dialkyl ether.

The ethers suitable for use as additives in the subject compositions should be waxy in character and compatible with the resinous components. It has been found that the alkyl chains of operable ethers should contain at least 12 carbon atoms each, and have a total of at least 28 carbon atoms per molecule in a saturated straight chain configuration. Exemplary operable ethers are the diethers obtained by the dehydration of alcohols such as tetradecyl, cetyl and stearyl alcohol, eicosanol, docosanol and the carnauba alcohols. Also contemplated are the mixed ethers derived from mixtures of the above alcohols with one another or with lower alcohols.

Resins suitable for use in the paint and varnish compositions of this invention, hereinafter referred to as coating resins, include the natural varnish resins, such as rosin or rosin esters; phenolic resins, which are usually products derived from the reaction of formaldehyde with para-alkyl substituted phenols; urea-formaldehyde and melamine formaldehyde resins, especially where the paint product is to be converted by the application of heat; polystyrene resins such as a styrene-modified material which may be copolymerized with unsaturated alkyd resins and drying oils; and materials such as polymethacrylic, coumarone and sulfonamide resins, chlorinated rubber, epichlorohydrin-bisphenol condensation resins, vinyls, etc. As is well known, the hard resins are preferably plasticized either physically or chemically with a material such as a drying oil or the like.

As thinner, it is contemplated that any of those known to the art be employed, depending on the nature of the particular coating composition. Well-known thinners include predominantly aliphatic materials such as mineral spirits, aromatics such as xylols, esters such as ethyl, butyl, or amyl acetate, ketones such as acetone, methyl ethyl ketone and cyclohexanone, alcohols and ethers such as ethanol, isopropanol, butanol and ethylene glycol monoethyl ether.

The amount of the synthetic wax of this invention suitable for use in protective coating compositions ranges from 0.25% to about 10% based on the resin. Certain proportions within the range may be more desirable, depending on the type of coating, the particular wax, and the end results desired. It has been found that the incorporation of from 0.25% to 5% of the subject synthetic waxes in oleoresinous, alkyd and epoxy resin ester varnishes gives compositions which, as dried films, are very water repellent, mar and abrasion resistant. Varnishes used as vehicles in pigmented paint products may in some cases advantageously contain even more than 5% wax, up to about 10%, based on the resin content. Amounts greater than 10% have been found to impart no appreciably improved characteristics to the coatings and adversely affect some types, causing a weakening of the film strength. Unlike natural waxes, the subject synthetic waxes are very soluble in varnish constituents, and when used in proper proportions, do not inhibit the curing of films by either air drying or baking methods. Such cured films adhere well and form good surfaces for recoating and those paints and varnishes applied over them show good surface adhesion.

Illustrative examples of the improved coating compositions of this invention are as follows, where proportions expressed refer to parts by weight unless otherwise indicated.

*Example 1*

An alkyd resin was prepared by heating 60 grams soya oil with 205 grams refined or distilled tall oil, having 50 to 60 percent fatty acids, to 450° F. 74 grams pentaerythritol and 0.1 to 0.5 gram of CaO were added. The temperature was held at 450–460° F. for alcoholysis, determined by a conventional test, such as clarity of solution containing 1 part of base and 4 parts of methyl alcohol. 76 grams phthalic anhydride and 9 grams of maleic anhydride were then added. The composition was then heated to 500° F. and held for acid number 10 or less, on base, and viscosity W–Z (Gardner-Holdt) at 50 percent solids in mineral spirits. The temperature is preferably lowered near the end of this part of cook. Then 20 grams polyamide resin, prepared from equivalent amounts of an ethylene diamine and dimerized soya bean oil acid, was added and the temperature held at 430–450° F. until 1 part base to 9 parts mineral spirits showed no graininess and had maximum turbidity. The composition was then thinned in mineral spirits. This entire process is best carried out in a covered vessel equipped with agitator and inert gas dispenser.

*Example II*

A basic varnish formula was prepared in which 15.8 grams of 100% phenolic resin, 57.8 grams of rosin modified phenolic resin and 50.8 grams of white refined linseed oil were weighted into a suitable processing kettle and the mixture heated to 560° F. and held at that temperature until a cold drop on a glass plate was clear (about 10 minutes). To this cook was added about 152 grams of China-wood oil and the temperature adjusted to 450° F. and held until the desired viscosity was obtained (A–A2 on Gardner-Holdt bubble viscosimeter at 40.0% ±1% nonvolatile content as subsequently thinned), solvents and thinners consisting of 25.2 grams of dipentene, 407 grams of mineral spirits were incorporated and the mixture cooled after which 3.3 grams of 24% lead naphthenate, 1.2 grams of 6% cobalt naphthenate, 0.5 gram of 6% manganese naphthenate, and 2.0 grams of 5% calcium octoate were added.

To this varnish was added 0.7 gram of ditetradecyl ether. The wax was added by warming it in an approximately equal portion of mineral spirits until dissolved, followed by immediate addition to the varnish which was then stirred to effect complete blending of the wax solution. A film was flowed on a glass plate and allowed to dry overnight in a room whose temperature was maintained between 70° F. and 80° F. Tap water was dropped on the dried film from a medicine dropper and the contact angle was determined to be 99°. A film obtained from the identical composition, except that it contained no ditetradecyl ether, exhibited a contact angle of 72°.

It is necessary that the ether be included in the coating composition in a quantity sufficient to increase the contact angle of water with the material treated with the paint at least 20° greater than that treated with a portion of the composition excluding the ether. The greater contact angle is a convincing indication of marked improvement in desirable characteristics such as water and water vapor repellency and mar resistance.

The tests referred to in each of the examples were conducted according to the "Sessile Drop Method." This method involves the direct observation of the interfacial angle made by the liquid as it contacts a flat horizontal surface and is sometimes referred to by the more descriptive term "Drop Silhouette Method." Small droplets of water were applied to the paint surface to be tested by means of a hypodermic syringe with the needle point ground square. A medicine dropper with a very small tip may also be used for this purpose. An optical system for projecting an enlarged image of the small droplets resting on the surface is required. A 25-power microscope was used and a shadow outline of the drops studied. This profile, esentially a cross section at the greatest diameter of the drop, is immediately studied with a goniometer eye piece and a photomicrographic record is preserved. The contact angle may be measured from the photomicrograph or through the goniometer but in either case a tangent is laid along the edge of the arc seen at the point of contact of the liquid and the solid surface. The angle between this tangent and a projection of the surface upon which the droplet rests is the contact angle. In using the goniometer, a cross hair was brought into position on this tangent and the angle read immediately from the protractor scale of the device. Previous setting to zero angle in the plane of the surface is required.

A contact angle increase of at least 20° over unmodified compositions has been established as a criterion to optimum film characteristics. Whenever the resulting contact angle is believed to approach the critical minimum of 20° improvement, the tests disclosed above may be employed to make the calculation. However, the experienced paint technician can most often determine with relative assuredness that the angle is sufficient merely by visually observing drops of water resting on a film. This is true since it has been found that most compositions containing the novel components herein disclosed increase the contact angle upwards of 30°.

*Example III*

A basic enamel was prepared by milling 600 grams of titanium calcium pigment, 25 grams of zinc oxide, 50 grams of calcium carbonate, 3 grams of aluminum stearate, 3 grams of soya lecithin, in 14 grams of 1% aluminum octoate gel in mineral spirits, 100 grams of the 40% nonvolatile solution of the alkyd resin of Example I, 342 grams of a 70% nonvolatile content alkyd resin (phthalic anhydride-pentaerythritol, 65% soya oil modified) and 160 grams of mineral spirits. After milling, driers were added in the amount of 6 grams of 6% cobalt naphthenate, 2 grams of 4% calcium naphthenate, and 2 grams of 8% zinc naphthenate.

To this basic enamel was added 2.05 grams of ditetradecyl ether by warming in approximately equal portion of mineral spirits until the wax was dissolved and this in turn was added to the enamel composition with stirring.

A film of this enamel was applied to a glass plate by means of a Bird applicator with a .006 inch clearance. The film was allowed to dry overnight in a room whose temperature varied between 70° F. and 80° F. The same enamel containing none of the dialkyl wax was applied and dried in the same manner. Water was then applied to both dried films from a medicine dropper. A markedly improved water repellent effect was noted in the wax modified film.

*Example IV*

To 715 parts of a varnish described in Example II, containing no dialkyl ether wax, was added 3.66 grams of dicetyl ether by dissolving the ether in an approximately equal portion of mineral spirits and adding to the varnish composition with stirring. A film applied and dried in the same manner as described for Example II evidenced a distinctly improved water repellent effect over the same composition from which the dicetyl ether was not added.

*Example V*

To 715 grams of a varnish described in Example II containing no dialkyl ether wax, was added .7 gram of dioctadecyl ether by dissolving the ether in an approximately equal portion of mineral spirits and adding to the varnish composition with stirring. A film applied and dried in the same manner as described for Example II evidenced a distinct water repellent effect.

*Example VI*

600 grams of titanium calcium pigment, 200 grams of magnesium silicate were milled in 296 grams of the 40% nonvolatile solution of the alkyd resin of Example I, 80 grams of 70% nonvolatile alkyd resin (phthalic anhydridepentaerythritol, 50% soya oil modified), 150 grams of mineral spirits and 19 grams of kerosene. After milling 5 grams of 24% lead naphthenate and 2 grams of 6% cobalt naphthenate were added.

To this flat paint was added 8.79 grams of ditetradecyl ether which was first dissolved in an approximately equal part of mineral spirits by warming until the ether was dissolved. The solution was then added to the flat paint composition with stirring.

Films of the paint composition, without the ether wax, and the paint composition with the ether wax were applied to glass plates with a Bird applicator of .006 inch clearance and allowed to dry overnight at a temperature between 70° F. and 80° F. Water was applied to the dried film by means of a medicine dropper. The film containing the ditetradecyl ether gave a distinct water repellent effect, whereas, the paint film without the ditetradecyl ether had no water repellent effect.

*Example VII*

To 715 grams of a varnish described in Example I, containing no dialkyl ether wax was added 0.7 gram of dodecyl-octadecyl ether by dissolving the same in an equal portion of mineral spirits and adding the solution to the varnish composition. A film of this varnish applied and dried as in Example I evidenced a pronounced water repellent effect when compared to the unmodified composition.

It should be appreciated that the compositions hereinbefore described are illustrative only and are in no way intended to be limited as to their common constituents since the latter are well known in the art with the exception of a novel use of the waxy diethers and their quantity relationship to the compositions. Likewise, the method of manufacture as disclosed in the examples is not intended to be limiting since it will be readily appreciated that the resulting compositions may be produced by other well known methods. Thus, although there are disclosed but a limited number of embodiments of the product of the invention herein presented, additional embodiments may be produced without departing from the inventive concept herein disclosed.

It is claimed and desired to secure by letters patent:

1. A permanent coating composition of the class comprising an organic paint and varnish coating resin dissolved in an organic solvent therefor characterized by improved water repellency and mar and abrasion resistance, said composition having dissolved therein 0.25 to about 10% by weight, based on the resin content, of a synthetic wax compatible with said resin, said synthetic wax being a saturated straight-chain dialkyl ether wherein each alkyl radical contains from 12-32 carbon atoms.

2. A permanent coating composition of the class comprising an organic paint and varnish coating resin dissolved in an organic solvent therefor characterized by improved water repellency and mar and abrasion resistance, said composition having dissolved therein 0.25 to about 10% by weight, based on the resin content, of a synthetic wax compatible with said resin, said synthetic wax being ditetradecyl ether.

3. A permanent coating composition of the class comprising an organic paint and varnish coating resin dissolved in an organic solvent therefor characterized by improved water repellency and mar and abrasion resistance, said composition having dissolved therein 0.25 to about 10% by weight, based on the resin content, of a synthetic wax compatible with said resin, said synthetic wax being dicetyl ether.

4. A permanent coating composition of the class comprising an organic paint and varnish coating resin dissolved in an organic solvent therefor characterized by improved water repellency and mar and abrasion resistance, said composition having dissolved therein 0.25 to about 10% by weight, based on the resin content, of a synthetic wax compatible with said resin, said synthetic wax being dioctadecyl ether.

5. A permanent coating composition of the class comprising an organic paint and varnish coating resin dissolved in an organic solvent therefor characterized by improved water repellency and mar and abrasion resistance, said composition having dissolved therein 0.25 to about 10% by weight, based on the resin content, of a synthetic wax compatible with said resin, said synthetic wax being dodecyloctadecyl ether.

6. The method of improving the water repellency and mar and abrasion resistance of a permanent coating composition of the class comprising an organic paint and varnish coating resin dissolved in an organic solvent therefor consisting of adding to said composition 0.25 to 10% by weight, based on the resin content of the composition of a synthetic wax compatible with said resin, said synthetic wax being a saturated straight-chain dialkyl ether wherein each alkyl radical contains from 12-32 carbon atoms.

No references cited.